(12) United States Patent
Maguire et al.

(10) Patent No.: US 10,355,259 B2
(45) Date of Patent: Jul. 16, 2019

(54) BATTERY PACK ARRAY SEPARATOR

(71) Applicant: Ford Global Technologies, LLC, Dearborn, MI (US)

(72) Inventors: Patrick Daniel Maguire, Ann Arbor, MI (US); Hyung Min Baek, Sunnyvale, CA (US); Brian Utley, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 107 days.

(21) Appl. No.: 15/660,026

(22) Filed: Jul. 26, 2017

(65) Prior Publication Data

US 2017/0324074 A1 Nov. 9, 2017

Related U.S. Application Data

(62) Division of application No. 14/245,273, filed on Apr. 4, 2014, now Pat. No. 9,853,275.

(51) Int. Cl.
| | |
|---|---|
| *H01M 2/18* | (2006.01) |
| *H01M 2/10* | (2006.01) |
| *H01M 10/04* | (2006.01) |
| *H01M 10/625* | (2014.01) |
| *H01M 10/647* | (2014.01) |
| *H01M 10/6554* | (2014.01) |
| *H01M 10/613* | (2014.01) |

(52) U.S. Cl.
CPC .......... *H01M 2/18* (2013.01); *H01M 2/1077* (2013.01); *H01M 10/0481* (2013.01); *H01M 10/613* (2015.04); *H01M 10/625* (2015.04); *H01M 10/647* (2015.04); *H01M 10/6554* (2015.04); *H01M 2220/20* (2013.01)

(58) Field of Classification Search
CPC ....................... H01M 2/14–18; H01M 10/613
See application file for complete search history.

(56) References Cited

U.S. PATENT DOCUMENTS

| | | | |
|---|---|---|---|
| 7,201,591 | B2 | 4/2007 | Fujii |
| 7,872,206 | B2 | 1/2011 | Matsunaga et al. |
| 8,071,234 | B2 | 12/2011 | Okada et al. |
| 8,268,474 | B2 | 9/2012 | Kim et al. |

(Continued)

FOREIGN PATENT DOCUMENTS

DE 102011109969 2/2013

*Primary Examiner* — Stephan J Essex
(74) *Attorney, Agent, or Firm* — Carlson, Gaskey & Olds, P.C.

(57) ABSTRACT

An exemplary method of securing battery cells of a battery pack includes limiting upward movement of a separator by blocking movement of a projection with a structure. The projection extends from a spacer section of the separator and has a hook shape with an upwardly extending portion outside the structure. The method further includes limiting upward movement of a battery cell using the separator. Another exemplary method of securing battery cells of a battery pack includes limiting movement of a separator in a direction by blocking movement of a projection in the direction. The projection extends from a spacer section of the separator. The projection has a hook shape with a portion extending in the direction. The spacer section and the portion are on opposite sides of a structure. The method further includes limiting movement of a battery cell in the direction using the separator.

17 Claims, 10 Drawing Sheets

(56) References Cited

U.S. PATENT DOCUMENTS

| | | |
|---|---|---|
| 8,367,239 B2 | 2/2013 | Hermann |
| 8,882,521 B2 | 11/2014 | Conway et al. |
| 2007/0037051 A1 | 2/2007 | Kim et al. |
| 2008/0160395 A1 | 7/2008 | Okada et al. |
| 2011/0162820 A1 | 7/2011 | Weber et al. |
| 2011/0206948 A1 | 8/2011 | Asai et al. |
| 2012/0003526 A1 | 1/2012 | Kume et al. |
| 2012/0009455 A1 | 1/2012 | Yoon |
| 2012/0107649 A1 | 5/2012 | Anderson et al. |
| 2012/0177952 A1 | 7/2012 | Maguire et al. |
| 2012/0298433 A1 | 11/2012 | Ohkura |
| 2012/0328918 A1 | 12/2012 | Kim |
| 2013/0071699 A1 | 3/2013 | Heise |
| 2013/0302653 A1 | 11/2013 | Pham et al. |
| 2014/0302378 A1 | 10/2014 | Tsuruta et al. |

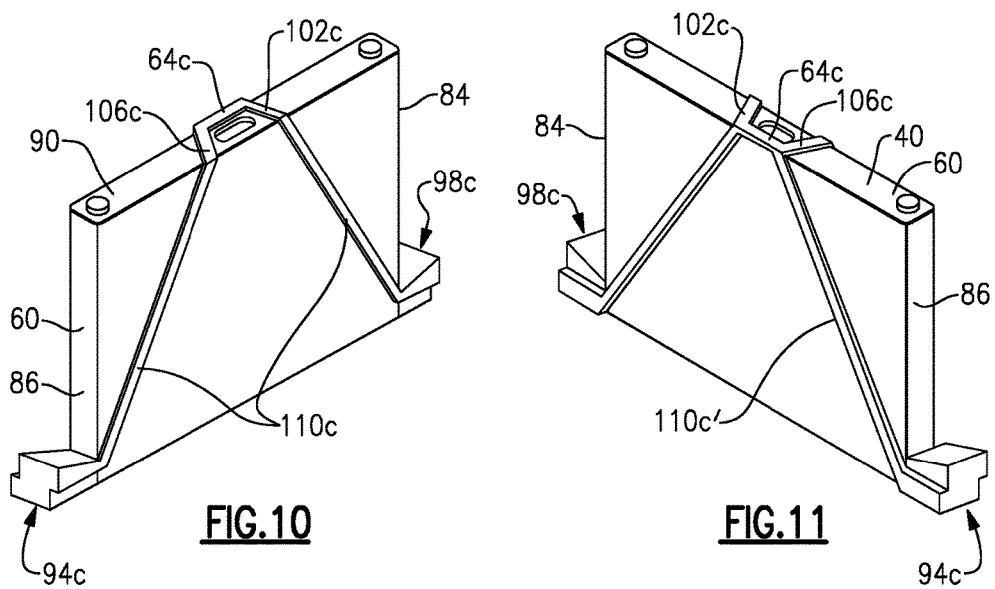

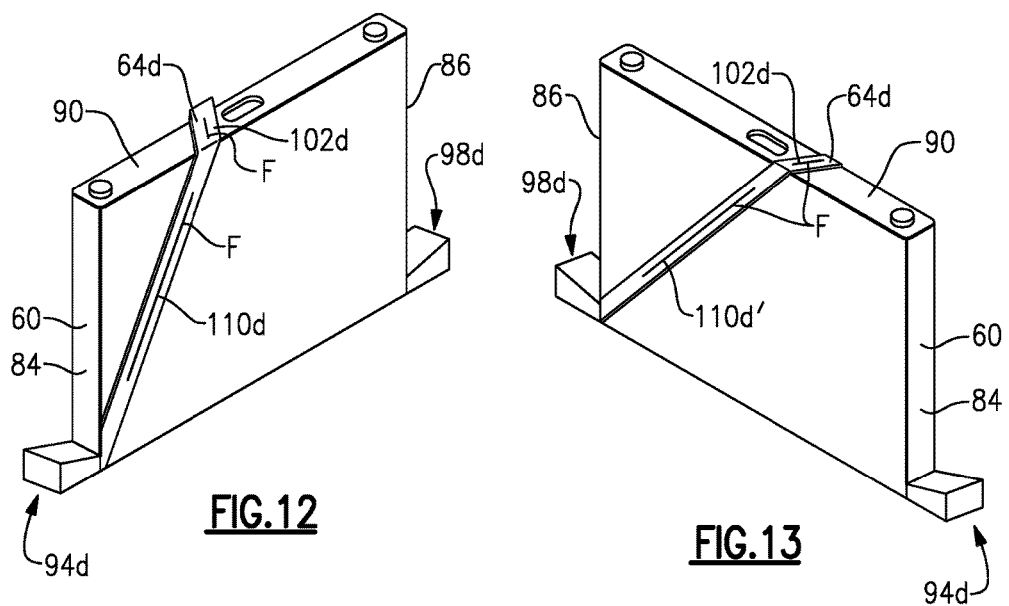

BATTERY PACK ARRAY SEPARATOR

CROSS-REFERENCE TO RELATED APPLICATIONS

This application is a divisional of U.S. patent application Ser. No. 14/245273, which was filed on 4 Apr. 2014 and is incorporated herein by reference.

BACKGROUND

This disclosure relates generally to a battery pack and, more particularly, to a separator between battery cells of an array structure of the pack. The separator assists in securing portions of the array structure, such as the cells.

Generally, electric vehicles differ from conventional motor vehicles because electric vehicles are selectively driven using one or more battery-powered electric machines. Conventional motor vehicles, by contrast, rely exclusively on an internal combustion engine to drive the vehicle. Electric vehicles may use electric machines instead of, or in addition to, the internal combustion engine.

Example electric vehicles include hybrid electric vehicles (HEVs), plug-in hybrid electric vehicles (PHEVs), fuel cell vehicles, and battery electric vehicles (BEVs). A powertrain of an electric vehicle is typically equipped with a battery pack having an array structure with battery cells that store electrical energy for powering the one or more electric machines. The battery cells may be charged prior to use. The battery cells may be recharged during a drive by regeneration braking or an internal combustion engine.

The battery cells can undesirably shift relative to other portions of the array structure. The shifting can occur, for example, when the array structure is installed within the vehicle, or when shipping the array structure prior to assembly in the vehicle.

SUMMARY

An exemplary method of securing battery cells in a battery pack includes, among other things, limiting upward movement of a separator by blocking movement of a projection with a structure. The projection extends from a spacer section of the separator and has a hook shape with an upwardly extending portion outside the structure. The method further includes limiting upward movement of a battery cell using the separator.

Another example of the foregoing method includes receiving the projection within an aperture of the structure.

In another example of any of the foregoing methods, the spacer section is positioned between a first battery cell and a second battery cell.

In another example of any of the foregoing methods, the structure is a side wall of an array structure of a battery pack.

Another example of any of the foregoing methods includes limiting the upward movement of the battery cell using a restraint tab extending from the spacer section.

In another example of any of the foregoing methods, the restraint tab extends across an upwardly facing surface of the battery cell.

In another example of any of the foregoing methods, the projection is at a bottom edge of the spacer section opposite the restraint tab.

Another example of any of the foregoing methods includes interlocking an interlocking portion of the restraint tab with an interlocking portion of a restraint tab of an axially adjacent separator within an array structure of a battery pack.

Another example of any of the foregoing methods includes snap-fitting a snap-fit portion of the restraining tab to a snap-fit portion of a restraint tab of an axially adjacent separator within an array structure of a battery pack.

In another example of any of the foregoing methods, the spacer section is a first spacer section and the method further comprises connecting the first spacer section to a second spacer section using the restraint tab. The first spacer section and the second spacer section are on opposing sides of the battery cell.

Another example of any of the foregoing methods includes the restraint tab interfacing with the battery cell relative to the spacer section through an interference fit.

Another example of any of the foregoing methods includes communicating coolant between adjacent battery cells using a portion of the separator that is between adjacent battery cells.

Another example of any of the foregoing methods includes biasing the battery cell downward using the separator.

Another example of any of the foregoing methods includes limiting lateral movement of the separator using feet of the separator that are positioned against opposing laterally outward facing surfaces of the battery cells.

In another example of any of the foregoing methods, the projection is at a lateral side of the spacer section.

In another example of any of the foregoing methods, the projection is a first projection and the structure is a first structure. The method further comprises limiting upward movement of the separator by blocking movement of a second projection with a second structure. The second projection extends from the spacer section of the separator and has a hook shape with an upwardly extending portion outside the structure. The first and second projections are opposite sides of the spacer section.

A method of securing battery cells of a battery pack according to another exemplary aspect of the present disclosure includes limiting movement of a separator in a direction by blocking movement of a projection in the direction. The projection extends from a spacer section of the separator. The projection has a hook shape with a portion extending in the direction. The spacer section and the portion are on opposite sides of a structure. The method further includes limiting movement of a battery cell in the direction using the separator.

Another example of the foregoing methods includes limiting the movement of the battery cell using a restraint tab extending from the spacer section.

DESCRIPTION OF THE FIGURES

The various features and advantages of the disclosed examples will become apparent to those skilled in the art from the detailed description. The figures that accompany the detailed description can be briefly described as follows:

FIG. 10 shows a perspective view of a battery cell and yet another example separators.

FIG. 11 shows another perspective view of the battery cell and separator of FIG. 10.

FIG. 12 shows a perspective view of a battery cell and yet another example separator.

FIG. 13 shows another perspective view of the battery cell and separator of FIG. 12.

DETAILED DESCRIPTION

Figure 1:
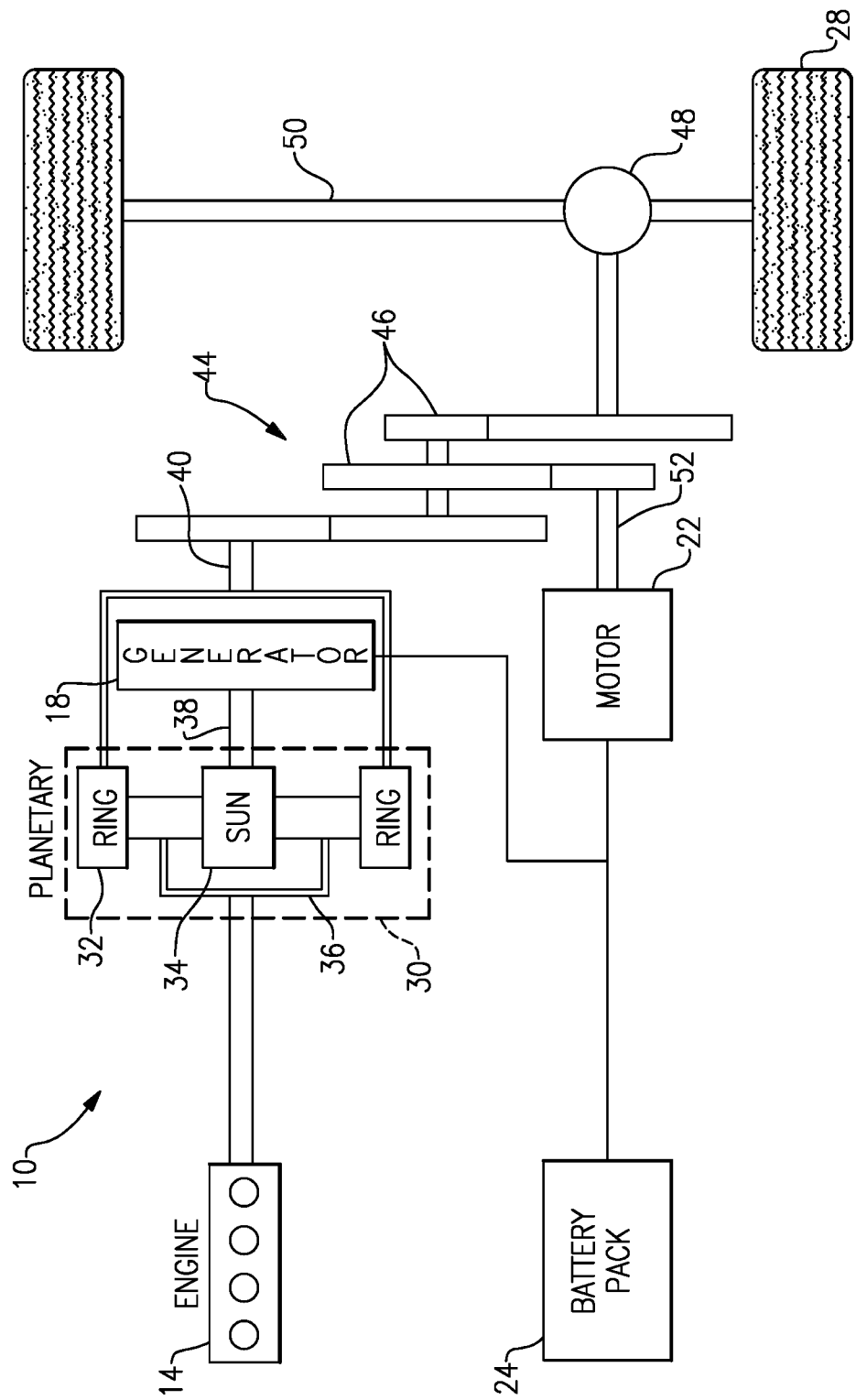
FIG. 1 schematically illustrates an example electric vehicle powertrain.

FIG. 1 schematically illustrates a powertrain 10 for an electric vehicle. Although depicted as a hybrid electric vehicle (HEV), it should be understood that the concepts described herein are not limited to HEVs and could extend to other electrified vehicles, including, but not limited to, plug-in hybrid electric vehicles (PHEVs) and battery electric vehicles (BEVs).

In one embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems generate torque to drive one or more sets of vehicle drive wheels 28 of the electric vehicle.

The engine 14, which is an internal combustion engine in this example, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 (i.e., the second electric machine) can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an example type of electric vehicle battery assembly. The battery pack 24 may incorporate a high voltage battery that is capable of outputting electrical power to operate the motor 22 and the generator 18. Other types of energy storage devices and/or output devices can also be used with the electric vehicle having the powertrain 10.

Figure 2:
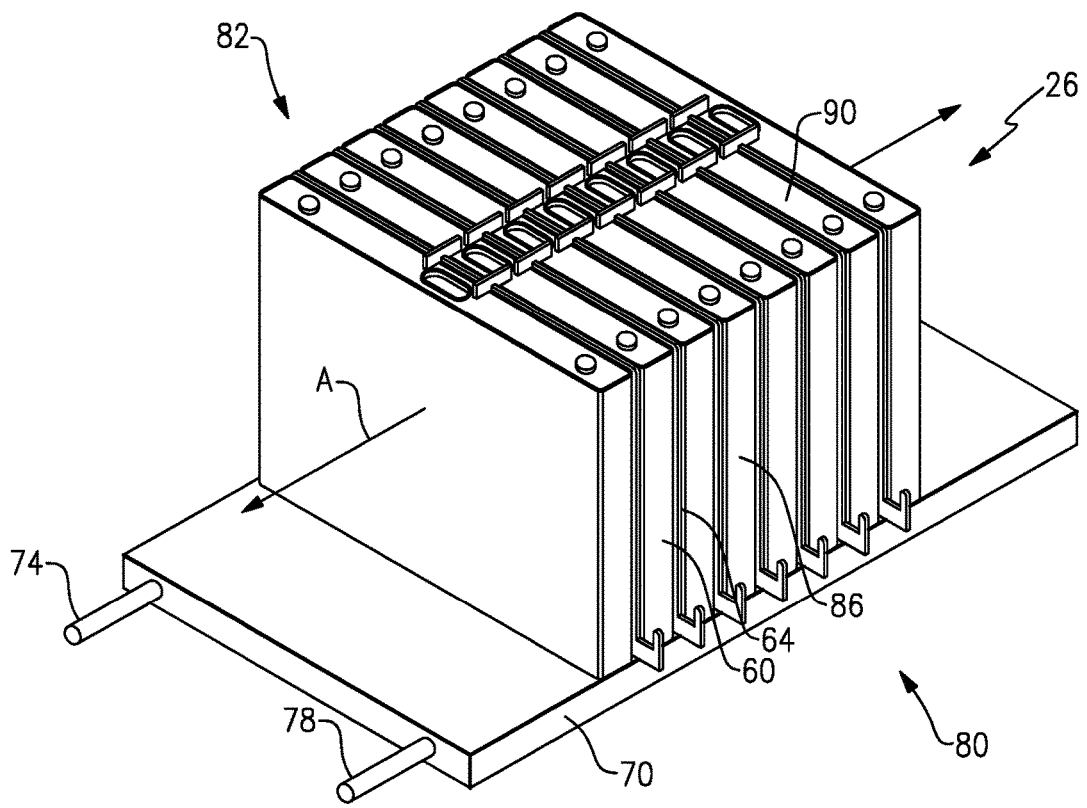
FIG. 2 shows a perspective view of an array structure of the battery pack of FIG. 1.
Figure 3:
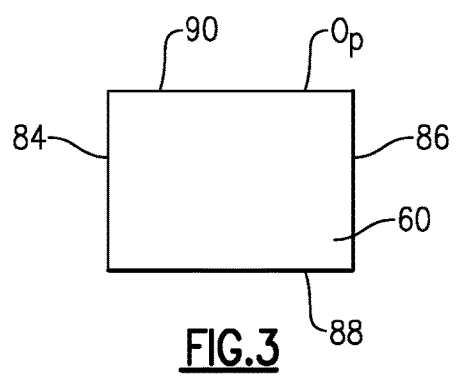
FIG. 3 shows a schematic side view of a cell of the array structure of FIG. 2.

Referring now to FIGS. 2 and 3, an array structure 26 of the example battery pack 24 includes an array of battery cells 60 and separators 64 along an axis A. The separators 64 can address isolation of the battery cells 60 from each other. In this example, each of the cells 60 is spaced from an adjacent cell by one of the separators 64. The array of battery cells 60 may include more or fewer battery cells 60 and separators 64 than shown in the highly schematic FIG. 2.

The example array structure 26 is cooled via liquid coolant communicated through a cold plate 70. The cells 60 and separators 64 are located on the cold plate 70. Liquid coolant moves through an inlet 74 to a coolant path established within the cold plate 70. The liquid coolant moves through the coolant path to exchange (could be heating or cooling) thermal energy from the cells 60 and other portions of the array structure 26. The liquid coolant exits from the cold plate 70 at an outlet 78.

In some examples, the separators 64 may provide channels with the cells 60 to communicate coolant, such as air, for cooling the battery cells 60.

The array structure 26 has a first lateral cell side 80 and a second lateral cell side 82. The first lateral cell side 80 opposes the second lateral cell side 82. The battery cells 60 extend laterally from a median position at the axis A to laterally outer cell sides 84 and 86.

The cells 60 further have a vertically lower cell side 88 and a vertically upper cell side 90. The vertically lower side 88 rests on the cold plate 70 in this example. Generally, the sides 84, 86, 88, and 90 define an outer profile Op of the cells 60.

Figure 4:
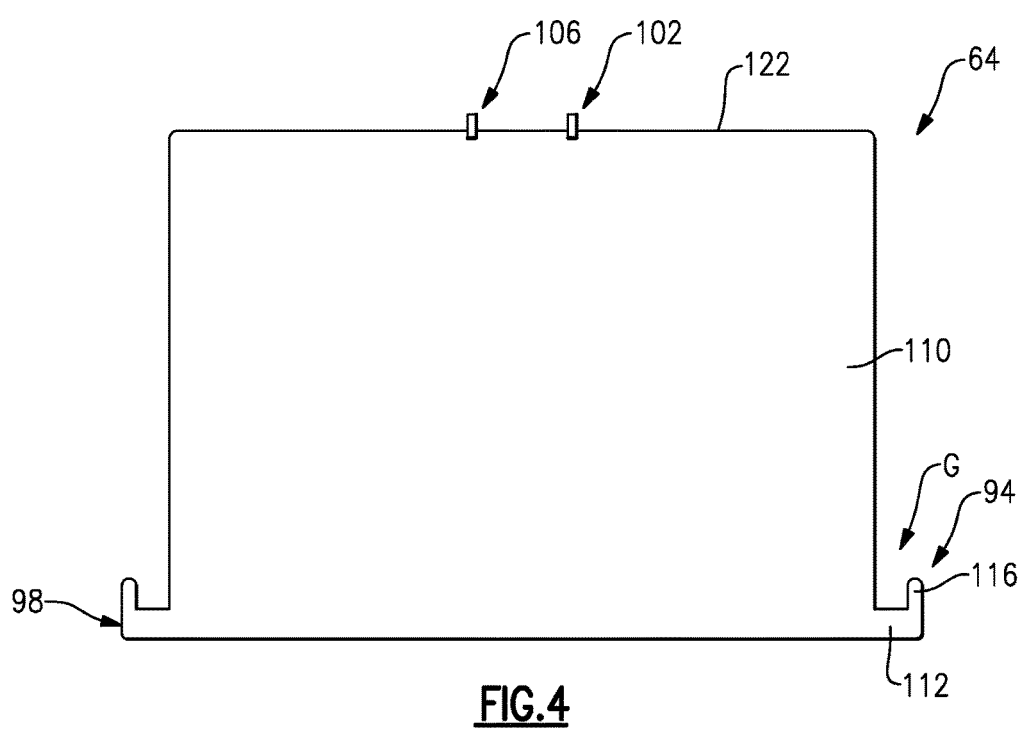
FIG. 4 shows a side view of an example separator.
Figure 5:
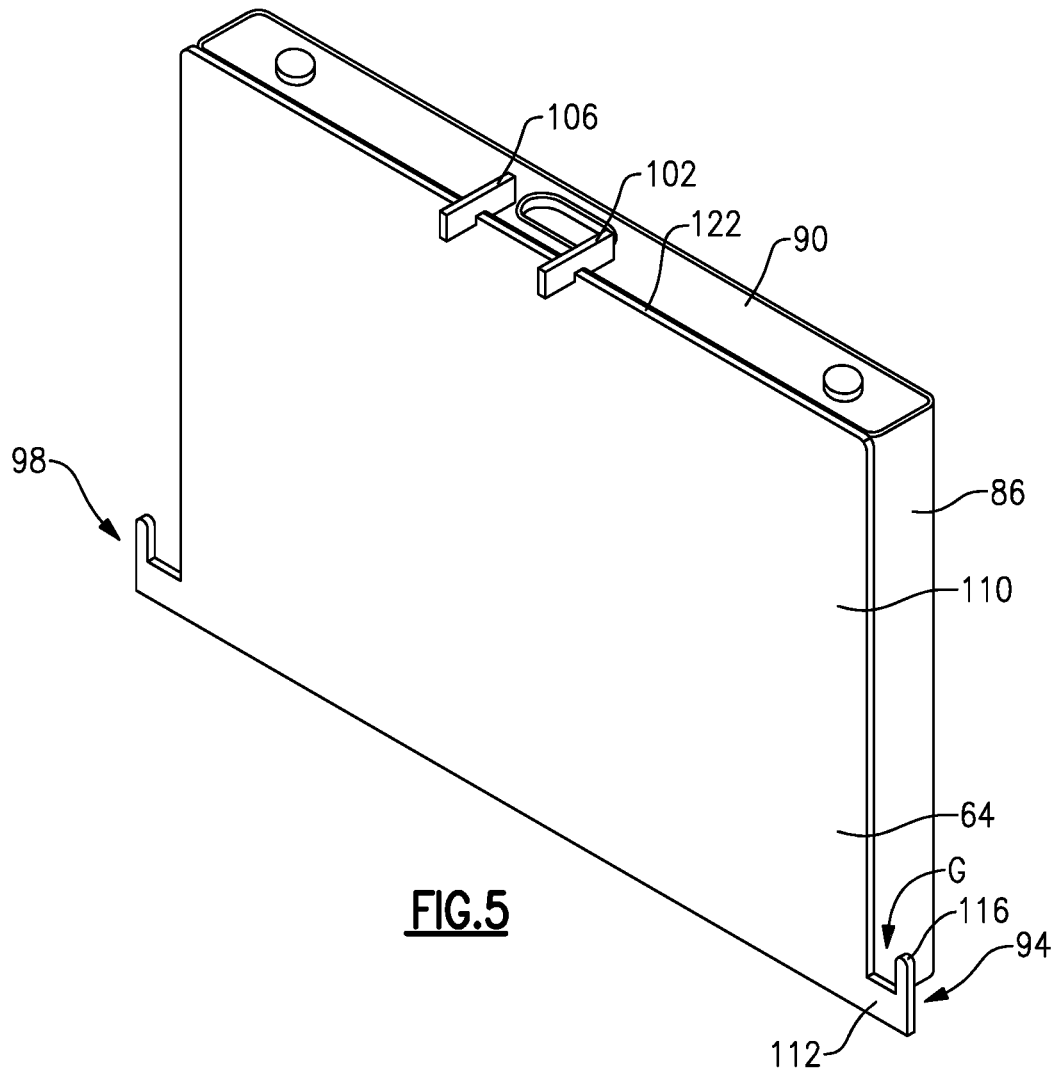
FIG. 5 shows a perspective view of the separator of FIG. 4 against a battery cell.

Referring now to FIGS. 4 and 5 with continued reference to FIGS. 2 and 3, the example separators 64 include a first projection 94, a second projection 98, a first restraint tab 102, and a second restraint tab 106. The separator 64 includes a spacer section 110 for positioning directly between adjacent cells 60. The first projection 94, the second projection 98, the first restraint tab 102, and the second restraint tab 106 extend from the spacer section 110.

The first projection 94 and the second projection 98 extend from opposing lateral sides of a spacer section 110 of the separator 64. The first projection 94 and the second projection 98 extend laterally outward away from the spacer section 110. The first projection 94 and the second projection 98 are considered "feet" in some examples.

The projection 94 and the projection 98 each include a laterally extending flange 112 and an upwardly extending portion 116 from the flange 112. The projection 94 and the projection 98 are hook-shaped in this example.

The restraint tabs 102 and 106 project axially from an upper edge 122 of the separator 64. The restraint tabs 106 and 102 extend over the vertically upper cell side 90 of an axially adjacent cell 60 within the array structure 26.

Notably, the array structure 26 may encounter forces encouraging the battery cells 60 and the separators 64 to move relative to each other. Excessive movement of the battery cells 60 relative to the separators 64 or relative to adjacent battery cells 60 is often undesirable. The array structure 26 may encounter these forces during shipping and before the array structure 26 is installed within a vehicle, or during the installation of array structure 26 within a vehicle. The array structure 26 may encounter these forces after the array structure 26 is installed within a vehicle.

In this example, the first projection 94, the second projection 98, the first restraint tab 102, and the second restraint tab 106 limit relative movement between the battery cells 60 and the separators 64. Relative movement between the battery cells 60 and the separators 64 is thus limited by the separator 64. Relative movement between the battery cells 60 and adjacent cells and relative movement between the battery cells 60 and other structures also may be limited.

Figure 6:
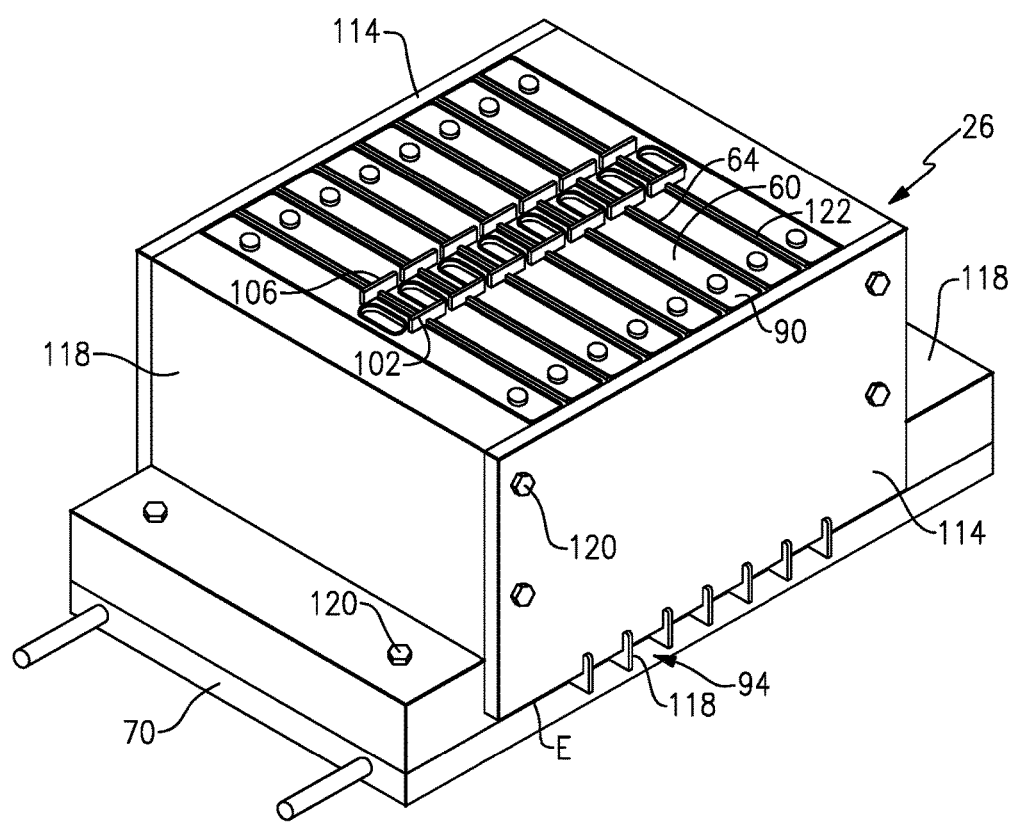
FIG. 6 shows another perspective view of the array structure of FIG. 1 with side walls and end walls.

Referring now to FIG. 6 with continuing reference to FIGS. 4 and 5, the array structure 26 includes various structures, such as laterally outer side walls 114 anchored to opposing end walls 118. The end walls 118 are secured to the cold plate 70. Mechanical fasteners 120 are used to secure the side walls 114, end walls 118, and cold plate 70 in this example.

Lateral movement of the separator 64 and of the battery cell 60 within the array structure 26 is limited by the side walls 114. The side walls 114 also limit lateral movement of the separator 64 relative to the battery cells 60. Lateral movement of the separator 64 within the array structure 26 can also be limited by contact between the outwardly facing surfaces of the side wall 114 and the upwardly extending portions 116 of the first projection 94 and the second projection 98.

Vertical movement of the separator 64 relative to the battery cells 60 and relative to other structures is limited by the projections 94, 98, and the restraint tabs 102, 106. The first projection 94 and the second projection 98 each define a groove G that receives a bottom edge E of a corresponding one of the side wall 114 of the array structure 26. The upward movement of the separator 64 within the array structure 26 is limited by the side wall 114 within the groove G. Contact between the cold plate 70 and the separator 64 limits downward movement of the separator 64. Thus, once the bottom edge E is received within the groove G in an assembled array structure 26, the vertical position of the separator 64 is fixed.

Conversely, the separator 64 can be designed never to touch the cold plate 70, but only load the cells 60 with downward force, which in turn touch the cold plate 70. This promotes good contact at all times between the cells 60 and cold plate 70.

The restraint tabs 102 and 106 project axially from an upper edge 122 of the separator 64. The restraint tabs 106 and 102 extend over the vertically upper cell side 90 of an axially adjacent cell 60 within the array structure 26. Contact between the cold plate 70 and the battery cell 60 limits downward movement of the battery cell 60. Contact between the side walls 114 and groove G of separator 64 limit upward movement of the separator 64. Contact between the upward facing surface of the battery cell 60 and the restraint tabs 102 and 106 on separator 64 limits the upward movement of the battery cell 60. The separator 64 thus traps the adjacent cells 60 vertically between the cold plate 70 and the restraint tabs 102, 106.

Figure 7:
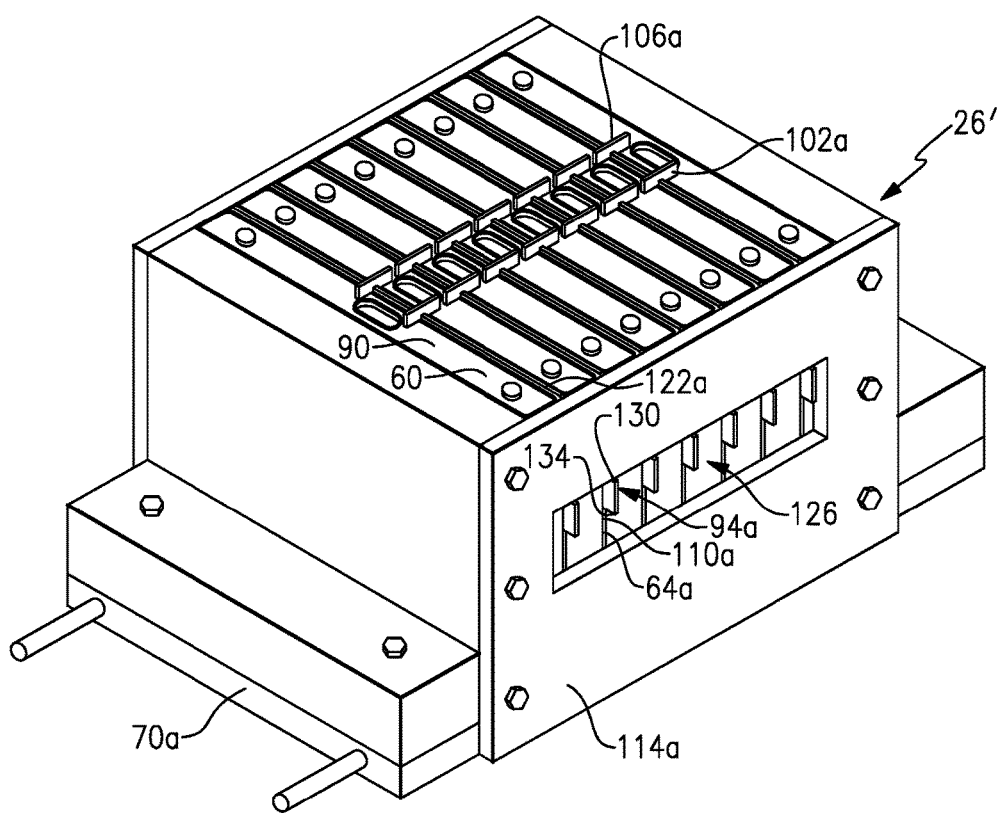
FIG. 7 shows a perspective view of a portion of another example array structure that incorporates another example separator.

Referring to FIG. 7, another example embodiment of the array structure 26' includes a separator 64*a*. A projection 94*a* extends from a spacer section 110*a* at a position near a vertical center of the spacer section 110*a*. The projection 94*a* is received within an aperture 126 of a side wall 114*a*.

Contact between an upper surface 130 of the projection 94*a* and the side wall 114*a* limits upward movement of the separator 64*a*. Contact between the cold plate 70 and the battery cell 60 limits downward movement of the battery cell 60. Contact between the upward facing surface of the battery cell 60 and the restraint tabs 102*a* and 106*a* on separator 64*a* limits the upward movement of the battery cell 60*a*. If the projections 94*a* are increased in size, contact between a vertically lower surface 134 of the projection 94*a* and the side wall 114*a* can limit vertically downward movement of the separator 64*a*.

Like the separator 64 of FIG. 6, the separator 64*a* includes restraint tabs 102*a* and 106*a* that limit vertically upward movement of the battery cell 60 relative to the separator 64*a*. The restraint tabs 102*a* and 106*a* project axially from an upper edge 122*a* of the separator 64*a*. The restraint tabs 102*a* and 106*a* extend over the vertically upper cell side 90 of the adjacent cells 60 within the array structure 26'. The separator 64*a* thus traps the adjacent cells 60 vertically between the cold plate 70*a* and the restraint tabs 102*a*, 106*a*.

The aperture 126 is shown oversized relative to the projection 94*a* in this example. The aperture 126 dimensions may vertically closely match the dimensions of the projection 94*a* to limit vertical movement of the separator 64*a*.

Figure 8:
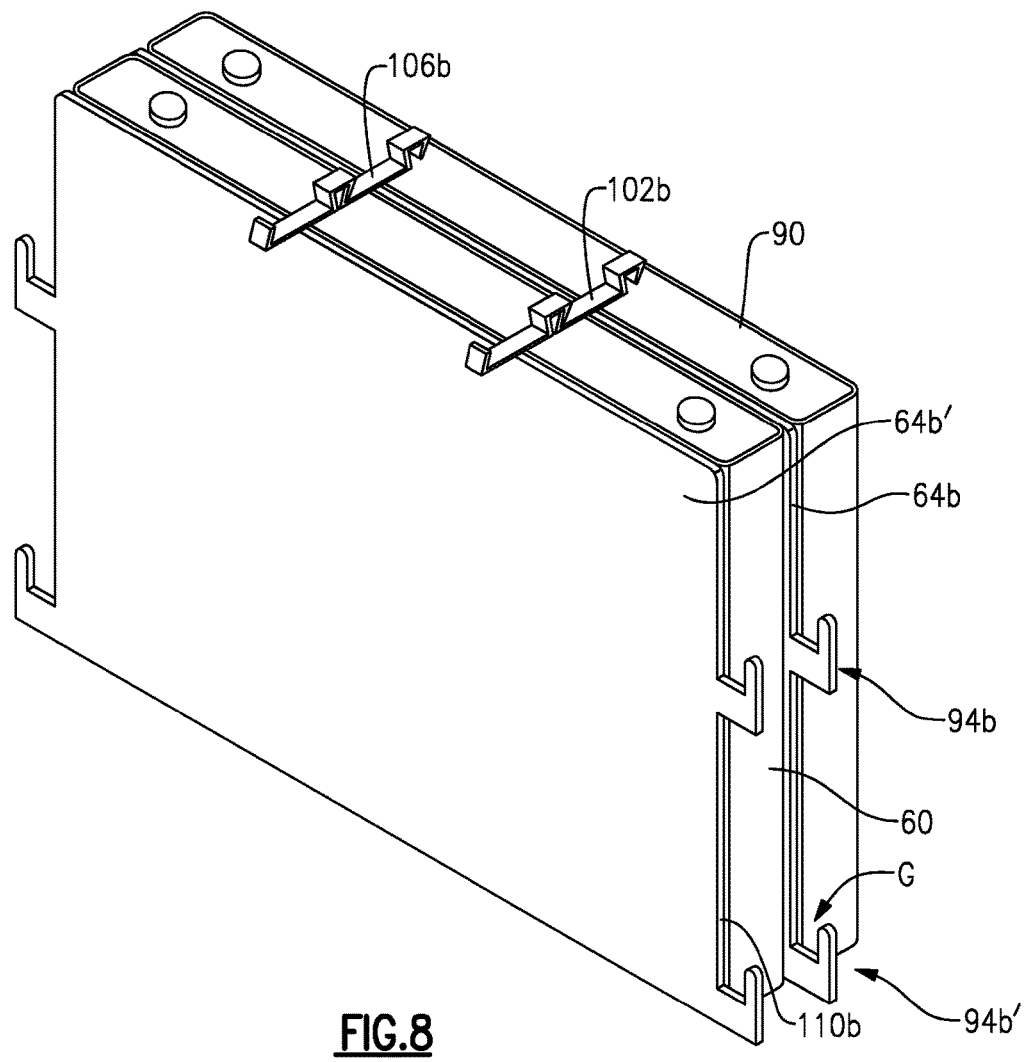
FIG. 8 shows a perspective view of battery cells and other examples separators.

Referring now to FIGS. 8 and 9, other example separators 64*b* include a projection 94*b* and another projection 94*b*' extending from a common laterally outboard side of a spacer section 110*b*. Each of the projections 94*b* and 94*b*' are received within respective apertures of a side wall (not shown) to limit vertically upward movement of the separator 64*b*. The projections 94*b* and 94*b*' are both hook shaped in this example and provide grooves G for receiving portions of the side wall.

The example separators 64*b* also include restraint tabs 102*b* and 106*b*, which are locking restraint tabs in this example. The restraint tabs 102*b* and 106*b* lock with corresponding restraint tabs 102*b*, 106*b* of an axially adjacent separator 64*b*'.

The restraint tabs 102*b* and 106*b* extend across upper cell side 90 of the battery cell 60 to engage with the restraint tabs of the separator 64*b*'. The restraint tabs 102*b* and 106*b* include flanges 140 received within grooves 144' to facilitate holding the position of the restraint tabs 102*b* and 106*b* and also the position of the battery cell 60 relative to the separator 64*b*. The grooves 144' are in the restraint tabs of the separator 64*b*' in this example.

The restraint tabs 102*b* and 106*b* are snap fit tabs or hooks in this example. The restraint tabs 102*b* and 106*b* also extend axially in another direction across the battery cell 60'. These portions of the restraint tabs 102*b* and 106*b* provide grooves 144 that receive flanges of another axially adjacent separator. The restraint tabs 102*b* and 106*b* snap-fit to the restraint tabs of the separator 64*b* and the other axially adjacent separator.

Figure 9A:
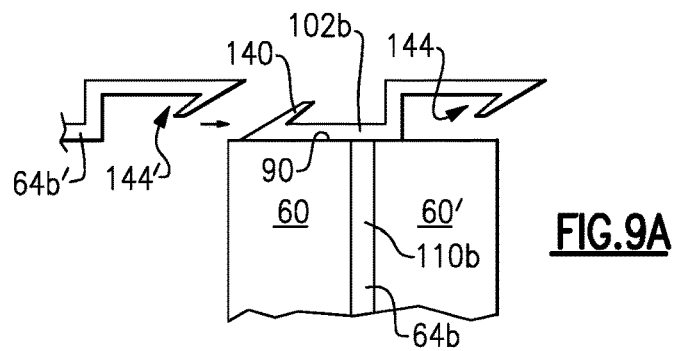
FIG. 9A shows a close-up side view of a portion of FIG. 8 prior to engagement of restraint tabs.
Figure 9B:
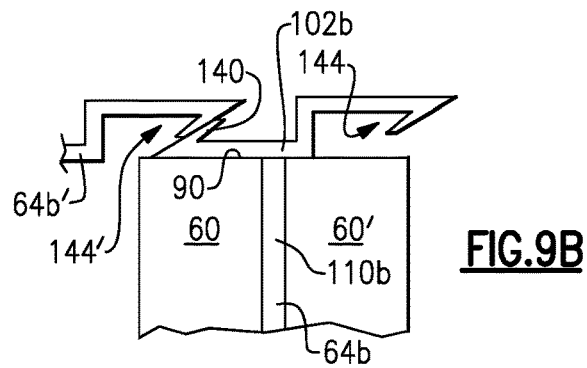
FIG. 9B shows a close-up side view of a portion of FIG. 8 during engagement of restraint tabs.
Figure 9C:
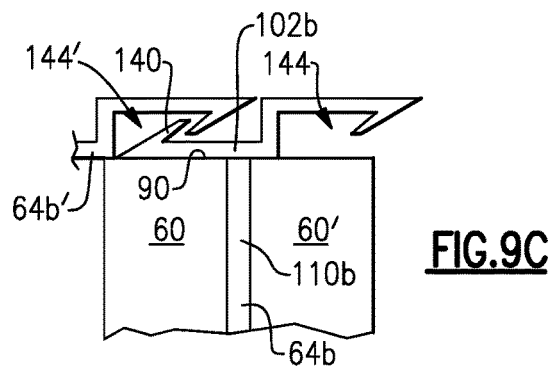
FIG. 9C shows a close-up side view of a portion of FIG. 8 during engagement of restraint tabs.
Figure 9D:
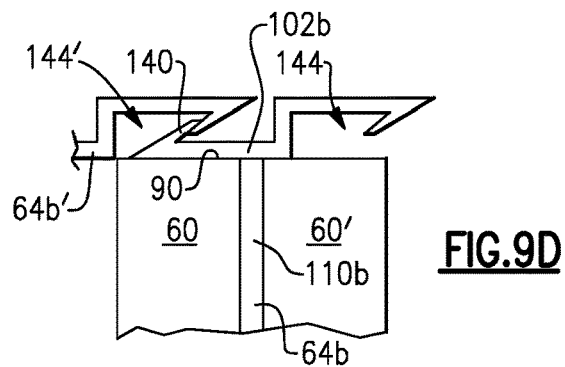
FIG. 9D shows a close-up side view of a portion of FIG. 8 after engagement of restraint tabs.

Specifically, the example restraint tabs 102*b* and 106*b* flex during engagement due to contact as shown in FIG. 9B. The restraint tabs may then over travel an adjacent restraint tab as shown in FIG. 9C, and then settle in the engaged position shown in FIG. 9D.

The flanges 140 engaging within the grooves 144' limits vertical upward movement of the cell 60 relative to the separators 64b and 64b'.

In some example, the cells 60 and 60' are compressed during assembly. The compression may cause the restraint tabs 102b, and 104b to snap, hook, or otherwise engage with the restrain tabs of the separator 64b', the restraint tabs of another axially adjacent separator, or both.

Referring now to FIGS. 10 and 11, another example separator 64c includes a first spacer section 110c and a second spacer section 110c' on an opposite side of the cell 60 from the spacer section 110c. The spacer sections 110c and 110c' are considered straps in some example. Restraint tabs 102c and 106c extend across the upper cell side 90 of the battery cell 60 to connect the first spacer section 110c to the second spacer section 110c'. The restraint tabs 102c and 106c can form a portion of the strap.

The separator 64c includes a first projection 94c and a second projection 98c. Both of the projections 94c and 98c are located near a vertically lower edge of the battery cell 60 in this example. The projections 94c and 98c connect to both the first spacer section 110c and the second spacer section 110c'.

In an installed position, the first projection 94c is axially aligned with the laterally outer side 86 of the cell 60. In the installed position, the second projection 98c is axially aligned with a laterally outer side 84 of the cell 60. Axially aligning the projections 94c and 98c with the cell 60 can strengthen the assembly, for example.

In the installed position, the projections 94c and 98c are received beneath side walls of a array structure, such as the side wall 114 of FIG. 6. Positioning the projections 94c and 98c beneath a side wall limits upward movement of the separator 64c relative to the side wall. The restraint tabs 102c and 106c then limit upward movement of the battery cell 60 relative to the separator 64c.

Instead of being positioned beneath a side wall, the projections 94c and 98c could also be received within an aperture of a side wall, such as the side wall 114a of FIG. 7. The separators 64c may include more than one projection 94c and 98c on a common lateral side.

The projections 94c and 98c could also be retained by an entirely separate feature such as a flange that is secured to the cold plate or tray underneath the cell array.

The spacer sections 110c and 110c' may be difficult to nest so other embodiments are contemplated.

For example, referring to FIGS. 12 and 13, in another example embodiment, a separator 64d includes a first spacer section 110d and a second spacer section 110d' on an opposite side of the cell 60 from the spacer section 110d. The spacer sections 110d and 110d' are considered straps in some example. A restraint tab 102d extends across the upper cell side 90 of the battery cell 60 to connect the first spacer section 110d to the second spacer section 110d'. The restraint tab 102d can form a portion of the strap.

The separator 64d includes a first projection 94d and a second projection 98d axially aligned with corresponding sides 84 and 86 of the battery cell 60. Both of the projections 94d and 98d are located near a vertically lower edge of the battery cell 60 in this example. The projection 94d connects to the first spacer section 110d but not the second spacer section 110d'. The projection 98d connects to the second spacer section 110d' but not the first spacer section 110d. The connection of the first spacer section 110d to the foot 94d and the second spacer section 110d' to the foot 98d is robust enough to avoid bending easily and "unwinding" the system.

In the installed position, the projections 94d and 98d are received beneath side walls of a array structure, such as the side wall 114 of FIG. 6. Positioning the projections 94d and 98d beneath a side wall limits upward movement of the separator 64d relative to the side wall. The restraint tabs 102d and 106d then limits upward movement of the battery cell 60 relative to the separator 64d.

Also, in the installed position, the restraint tabs 102d and 106d force the battery cells 60 downward, which facilitates the battery cells 60 contacting a cold plate, for example. The restraint tabs 102d and 106d, and the restraint tabs of the other example embodiments could be designed to have an interference fit to bias the battery cells 60 downward. The interference fit would accommodate piece to piece variations of the cells 60 and separators 64d. The bias snugs the cells 60 toward the cold plate. A resilient material, such as a thermal interface material, may be located between the cells 60 and the cold plate.

Instead of being positioned beneath a side wall, the projections 94d and 98d could also be received within an aperture of a side wall, such as the side wall 114a of FIG. 7. The separators 64c may include more than one projection 94d and 98d on a common lateral side.

The projections 94d and 98d of this and other example embodiments could also be retained by a feature other than the side wall such as a bracket, retention bar, fastener, etc.

The example separators of FIGS. 2-14, can be a long fiber thermoplastic resin, such as polypropylene, Polyethylene terephthalate, or Polybutylene terephthalate. In other examples, other materials may be used, such as a short fiber reinforced thermoplastic resin or some other material. The long fibers may be aligned within the separators along the path of the spacer sections, such as along the fiber lines F in FIGS. 12 and 13. The strap-type spacers of FIGS. 10-14 may be reinforced with continuous fibers.

Features of the example embodiments include limiting upward movement of battery cells within a array structure without requiring side walls of the array structure to extend laterally over the battery cells. Movement of battery cells in a positive z direction is restricted without complicated molding process and significant extra cost. Isolation faults between the side walls and terminals of the battery cells are reduced when this movement is restricted.

Also, with respect to the examples of FIGS. 10 to 14 the feet and can prevent lateral movement of the cells. Due to the shape of each of these spacers, if the cell experiences a force attempting to laterally move or translate the cell, the force which results in a moment tending to rotate the cell about the foot feature. The strap feature of these examples will then experience tension as the cell attempts to rotate and the rotation should be prevented or arrested. Thus, these designs allow the cells to be retained at the projections to the tray and/or cold plate without requiring additional features along the sides or top of the cells required to prevent lateral or upward movement.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A method of securing battery cells of a battery pack, comprising:

limiting upward movement of a separator by blocking movement of a projection with a structure, the projection extending from a spacer section of the separator and having a hook shape with an upwardly extending portion outside the structure; and limiting upward movement of a battery cell using the separator;

wherein the spacer section is positioned between a first battery cell and a second battery cell.

2. The method of claim 1, further comprising receiving the projection within an aperture of the structure.

3. The method of claim 1, wherein the structure is a side wall of an array structure of a battery pack.

4. The method of claim 1, further comprising limiting the upward movement of the battery cell using a restraint tab extending from the spacer section.

5. The method of claim 4, wherein the restraint tab extends across an upwardly facing surface of the battery cell.

6. The method of claim 4, wherein the projection is at a bottom edge of the spacer section opposite the restraint tab.

7. The method of claim 4, further comprising interlocking an interlocking portion of the restraint tab with an interlocking portion of a restraint tab of an axially adjacent separator within an array structure of a battery pack.

8. The method of claim 4, further comprising snap-fitting a snap-fit portion of the restraining tab to a snap-fit portion of a restraint tab of an axially adjacent separator within an array structure of a battery pack.

9. The method of claim 4, wherein the spacer section is a first spacer section and further comprising a second spacer section, and further comprising connecting the first spacer section to the second spacer section using the restraint tab, the first spacer section and the second spacer section on opposing sides of the battery cell.

10. The method of claim 4, wherein the restraint tab interfaces with the battery cell relative to the spacer section through an interference fit.

11. The method of claim 1, further comprising communicating coolant between adjacent battery cells using a portion of the separator that is between adjacent battery cells.

12. The method of claim 1, further comprising biasing the battery cell downward using the separator.

13. The method of claim 1, further comprising limiting lateral movement of the separator using feet of the separator that are positioned against opposing laterally outward facing surfaces of the battery cells.

14. The method of claim 1, wherein the projection is at a lateral side of the spacer section.

15. The method of claim 1, wherein the projection is a first projection and the structure is a first structure, and further comprising limiting upward movement of the separator by blocking movement of a second projection with a second structure, the second projection extending from the spacer section of the separator and having a hook shape with an upwardly extending portion outside the structure, the first and second projections on opposite sides of the spacer section.

16. A method of securing battery cells of a battery pack, comprising:

limiting movement of a separator in a direction by blocking movement of a projection in the direction, the projection extending from a spacer section of the separator, the projection having a hook shape with a portion extending in the direction, the spacer section and the portion on opposite sides of a structure; and limiting movement of a battery cell in the direction using the separator;

wherein the spacer section is positioned between a first battery cell and a second battery cell.

17. The method of claim 16, further comprising limiting the movement of the battery cell using a restraint tab extending from the spacer section.

* * * * *